US009691094B2

(12) United States Patent
Dundas

(10) Patent No.: US 9,691,094 B2
(45) Date of Patent: Jun. 27, 2017

(54) RETAIL SYSTEM AND COMPUTER-IMPLEMENTED METHOD FOR DESIGNING A CUSTOMIZATION OF A PRODUCT

(71) Applicant: Katori, Inc., San Francisco, CA (US)

(72) Inventor: Matthew D. Dundas, Brooklyn, NY (US)

(73) Assignee: Katori, Inc., San Francisco, CA (US)

( * ) Notice: Subject to any disclaimer, the term of this patent is extended or adjusted under 35 U.S.C. 154(b) by 0 days.

(21) Appl. No.: 14/686,658

(22) Filed: Apr. 14, 2015

(65) Prior Publication Data

US 2016/0005093 A1 Jan. 7, 2016

Related U.S. Application Data

(60) Provisional application No. 62/019,723, filed on Jul. 1, 2014.

(51) Int. Cl.
*G06Q 30/00* (2012.01)
*G06Q 30/06* (2012.01)

(52) U.S. Cl.
CPC ..... *G06Q 30/0621* (2013.01); *G06Q 30/0643* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| 7,216,092 | B1 | 5/2007 | Weber et al. | |
|---|---|---|---|---|
| 8,700,492 | B1 | 4/2014 | Scott | |
| 2007/0033568 | A1* | 2/2007 | Barrieau et al. | 717/101 |
| 2009/0070666 | A1 | 3/2009 | Eilers et al. | |
| 2010/0185309 | A1 | 7/2010 | Ohiaeri et al. | |
| 2011/0078028 | A1* | 3/2011 | Glynias et al. | 705/14.73 |
| 2011/0313878 | A1* | 12/2011 | Norman | 705/26.5 |

OTHER PUBLICATIONS

International Search Report and Written Opinion dated Sep. 15, 2015, International PCT Application No. PCT/US15/37496 with International Filing Date of Jun. 24, 2015, (11 pages).

* cited by examiner

*Primary Examiner* — Ethan D Civan
(74) *Attorney, Agent, or Firm* — Stephen M. De Klerk

(57) ABSTRACT

A customer at a customer computer system transmits a page request to a retailer computer system. The retailer computer system transmits a product page and a script to the customer computer system. The script is executable by the customer computer system to transmit a customization request from the customer computer system to a customization computer system. The customization computer system inserts controls and a save selector onto the customer computer system. Use of the controls at the customer computer system allows for customization of an image of the product viewed on a display of the customer computer system to render a compound image. Selection of the save selector at the customer computer system causes transmission of a transmission packet from the customization computer system to the retailer computer system. The retailer computer system stores the compound image in a shopping cart associated with the customer computer system.

18 Claims, 7 Drawing Sheets

RETAIL SYSTEM AND COMPUTER-IMPLEMENTED METHOD FOR DESIGNING A CUSTOMIZATION OF A PRODUCT

CROSS-REFERENCE TO RELATED APPLICATIONS

This application claims priority from U.S. Provisional Patent Application No. 62/019,723, filed on Jul. 1, 2014, all of which is incorporated herein by reference in its entirety.

BACKGROUND OF THE INVENTION

1). Field of the Invention

This invention relates to a computer-implemented method and a system that allows for the designing customizations of products.

2). Discussion of Related Art

An online retailer typically operates a retailer computer system having a data store of products. Each product could have an image of the product, a respective stock keeping unit (SKU) and/or color selection. A customer at a customer computer system uses a browser to request a product page during a shopping experience on a retailer website. The retailer computer system responds to the request by transmitting the product page to the customer computer system. When the customer computer system receives the product page, it is displayed within a browser window of the browser of the customer computer system. The product page usually includes an image and often additional details such as the SKU and a color selection. The customer can often select a quantity. The customer can then select to save the product and quantity to a shopping cart associated with the customer computer system. The shopping cart resides on the retailer computer system and can be accessed by the customer from the customer computer system.

Some retailers allow for aftermarket customization of products. After the customer has checked out by paying for the product or products, the retailer website often provides a link that redirects the browser to another website for customizing the product. The shopping experience at the retailer website is thereby broken. The alternative to having the shopping experience broken would be for the retailer to build customization functionality into their website. However, retailers may not wish to devote additional resources to the development of customization functionality in their websites.

SUMMARY OF THE INVENTION

The invention provides a computer-implemented method of designing a customization of a product, including receiving, by a customization computer system, a customization request from a customer computer system at the customization computer system and in response to receiving the customization request from the customer computer system at the customization computer system inserting, by the customization computer system, controls and a save selector onto the customer computer system, use of the controls at the customer computer system allowing for customization of an image of the product viewed on a display of the customer computer system to render a compound image including the image and at least one customization, selection of the save selector at the customer computer system causing transmission of a transmission packet to a retailer computer system, and reception of the transmission packet at the retailer computer system, the retailer computer system, in response to receiving the transmission packet, storing the compound image in a shopping cart associated with the customer computer system.

The invention also provides a non-transitory computer-readable medium having stored thereon a set of instructions which, when executed by a processor of a computer, carries out a computer-implemented method of receiving, by a customization computer system, a customization request from a customer computer system at the customization computer system and in response to receiving the customization request from the customer computer system at the customization computer system inserting, by the customization computer system, controls and a save selector onto the customer computer system, use of the controls at the customer computer system allowing for customization of an image of the product viewed on a display of the customer computer system to render a compound image including the image and at least one customization, selection of the save selector at the customer computer system causing transmission of a transmission packet to a retailer computer system, and reception of the transmission packet at the retailer computer system, the retailer computer system, in response to receiving the transmission packet, storing the compound image in a shopping cart associated with the customer computer system.

The invention further provides a customization computer system, including a processor, a computer-readable medium connected to the processor and a set of instructions on the computer-readable medium. The set of instructions including a reception unit receiving a customization request from a customer computer system, controls, a save selector and insertion code that, in response to receiving the customization request from the customer computer system, inserts the controls and the save selector onto the customer computer system, use of the controls at the customer computer system allowing for customization of an image of the product viewed on a display of the customer computer system to render a compound image including the image and at least one customization, selection of the save selector at the customer computer system causing transmission of a transmission packet to a retailer computer system, and reception of the packet at the retailer computer system, the retailer computer system, in response to receiving the transmission packet, storing the compound image in a shopping cart associated with the customer computer system.

The invention also provides a computer-implemented method of designing a customization of a product, including receiving, by a retailer computer system, a page request from a customer computer system at the retailer computer system, in response to receiving the page request from a customer computer system at the retailer computer system, transmitting a product page and a script from the retailer computer system to the customer computer system, wherein the script is executable by the customer computer system to transmit a customization request from the customer computer system to a customization computer system, the customization computer system responding to the customization request to insert controls onto the customer computer system for creating at least one customization of an image of the product, and a save selector that causes transmission of a transmission packet to the retailer computer system, the transmission packet including a compound image generated from the image and the at least one customization, receiving, by the retailer computer system, the transmission packet and in response to receiving the transmission packet by the retailer computer system, storing, by the retailer computer system, the compound image in a shopping cart associated with the customer computer system.

The invention further provides non-transitory computer-readable medium having stored thereon a set of instructions which, when executed by a processor of a computer, carries out a computer-implemented method of receiving, by a retailer computer system, a page request from a customer computer system at the retailer computer system, in response to receiving the page request from a customer computer system at the retailer computer system, transmitting a product page and a script from the retailer computer system to the customer computer system, wherein the script is executable by the customer computer system to transmit a customization request from the customer computer system to a customization computer system, the customization computer system responding to the customization request to insert controls onto the customer computer system for creating at least one customization of an image of the product, and a save selector that causes transmission of a transmission packet to the retailer computer system, the transmission packet including a compound image generated from the image and the at least one customization, receiving, by the retailer computer system, the transmission packet; and in response to receiving the transmission packet by the retailer computer system, storing, by the retailer computer system, the compound image in a shopping cart associated with the customer computer system.

The invention also provides a retailer computer system including a processor, a computer-readable medium connected to the processor and a set of instructions on the computer-readable medium. The set of instructions may include a reception unit receiving a page request from a customer computer system, a product page, a script, a transmission unit transmitting the product page and the script from the retailer computer system to the customer computer system, wherein the script is executable by the customer computer system to transmit a customization request from the customer computer system to a customization computer system, the customization computer system responding to the customization request to insert controls onto the customer computer system for creating at least one customization of an image of the product and a save selector that causes transmission of a transmission packet to the retailer computer system, the transmission packet including a compound image generated from the image and the at least one customization, the reception unit receiving the transmission packet, a shopping cart and a storing unit that in response to receiving the transmission packet by the retailer computer system, storing, by the retailer computer system, the compound image in a shopping cart associated with the customer computer system.

BRIEF DESCRIPTION OF THE DRAWINGS

The invention is further described by way of example with reference to the accompanying drawings, wherein.

DETAILED DESCRIPTION OF THE INVENTION

Figure 1:
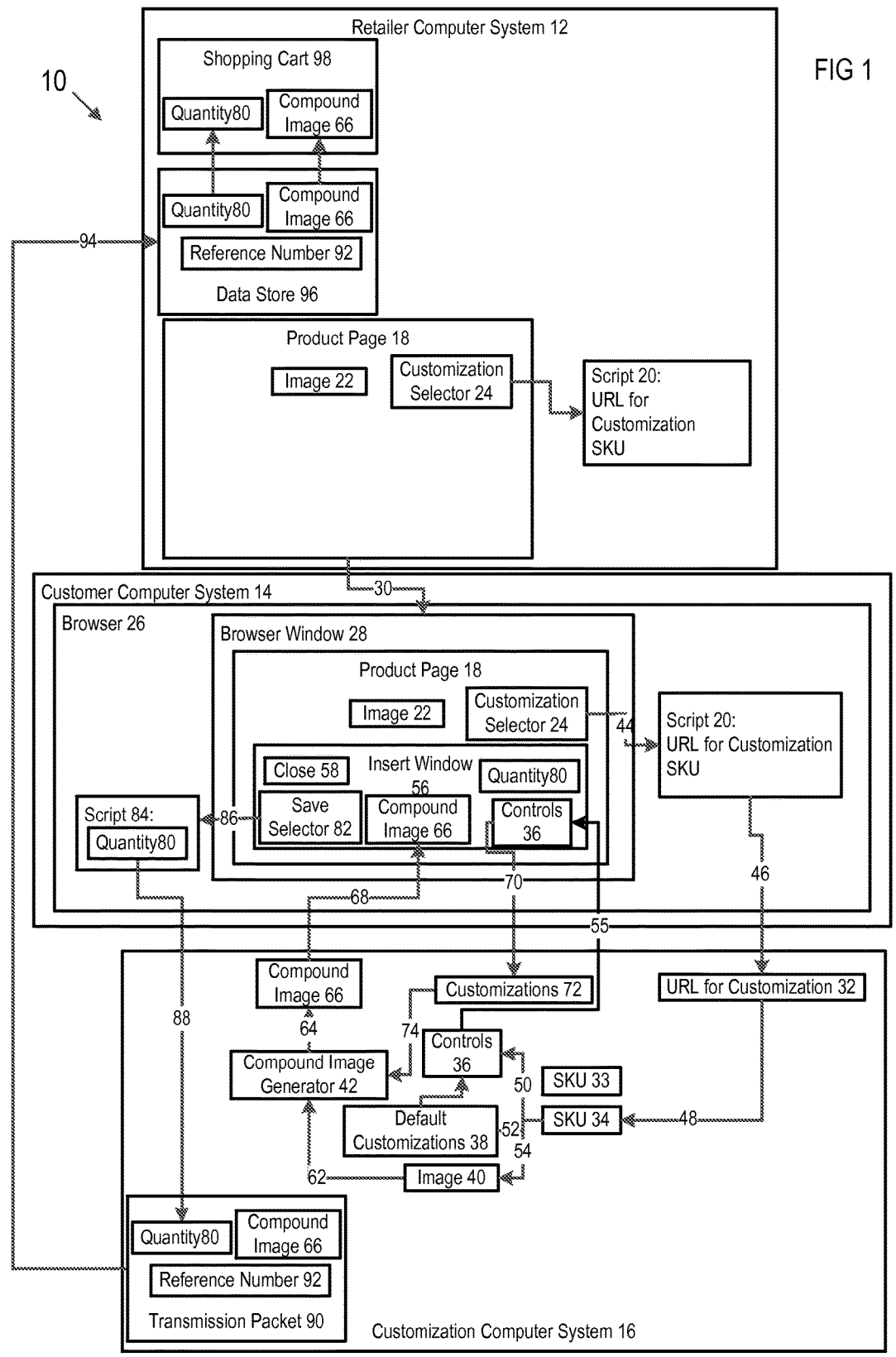
FIG. 1 is a block diagram of retail system according to an embodiment of the invention that allows for customization of images of products that are offered for sale

FIG. 1 of the accompanying drawings illustrates a retail system 10 that is used for carrying out a computer-implemented method of designing a customization of a product, including a retailer computer system 12, a customer computer system 14, and a customization computer system 16.

The retailer computer system 12 includes a product page 18 with an associated script 20. The product page 18 has an image 22 of a product that is being offered for sale by the retailer computer system 12. The product page 18 also has a customization selector 24 associated with the script 20. The script 20 includes a number of parameters. For initial discussion, the script 20 includes a URL for customization and a SKU. The retailer computer system 12 may have a plurality of product pages, each with a respective unique image, a script and a respective unique SKU. The script is the same for all the product pages and has values that automatically populate depending on the particular products.

The customer computer system 14 has a browser 26 with a browser window 28. A customer at the customer computer system 14 uses a transmission unit of the browser 26 to transmit a page request for the product page 18 to the retailer computer system 12. The customer typically causes the transmission of such a page request as part of an online shopping experience on a retailer website of the retailer computer system 12. A reception unit of the retailer computer system 12 receives the page request and a transmission unit of the retailer computer system 12 at 30 responds to the page request to transmit the product page 18 and the script 20 to the customer computer system 14. The customer at the customer computer system 14 can view the product page 18 within the browser window 28. The image 22 is also displayed within the product page 18 together with the customization selector 24. The script 20 resides within the browser 26 on the customer computer system 14 and is executable when the customer selects the customization selector 24.

The customization computer system 16 has a URL for customization 32, which represents its address on the Internet. The customization computer system 16 further includes a plurality of SKU's 33 and 34, each with its own separate controls 36, default customizations 38 and images 40. The customization computer system 16 also has a compound image generator 42.

When the customer at the customer computer system 14 selects the customization selector 24, the customization selector at 44 causes execution of the script 20. The script 20, at 46, transmits the SKU to the URL for customization forming part the script 20. The URL for customization 32 at the customization computer system 16 is the same as the URL for customization in the script 20, which means that the customization request transmitted at 46 is received by a reception unit of the customization computer system 16. The reception unit of the customization computer system 16 thus receives the SKU from the customer computer system 14. The script is typically written in a dynamic language such as JavaScript®, which is used as part of web browsers, with implementations that allow client-side scripts to interact with the user, control the browser, communicate asynchronously, and alter the document content that is displayed. The following is an example of the script 20:

```
// Called when Shopper clicks 'Personalize'
    onLoad: function( ) {
        var data = { };
        // Provide the SKU
        data.sku = 'FGRC0812';
        // If Item is already in the Cart you will also need
to provide the refnum and quantity
        data.refnum = 'WFGE78DIB';
        data.quantity = 2;
        return data;
    }
```

The customization computer system 16 has insertion code that responds to the customization request received at 46 to create an insert window 56 that overlays a portion of the product page 18. The insert window 56 has a close selector 58. Selection of the close selector 58 by the customer removes the insert window 56 from the browser window 28 so that only the product page 18 remains within the browser window 28.

At 48, the customization computer system 16 matches the SKU received in the customization request received at 46 to one of the SKU's 34 among the SKU's 33 and 34. At 50, 52 and 54, the customization computer system 16 finds the controls 36, default customizations 38 and the image 40 associated with the selected SKU 34. The default customizations 38 may for example be default initials such as "DHA." The controls 36 make use of the default customizations 38 for their initial settings. At 55, the insertion code inserts the controls 36 into the insert window 56.

At 62, the image 40 is provided to the compound image generator 42. The compound image generator 42 does not at this stage have any further customizations other than the default customizations 38. At 64, the compound image generator 42 provides an output comprising a compound image 66 which, it will be understood, does not have any further customizations at this point in time. At 68, the insertion code of the customization computer system 16 transmits the compound image 66 to the customer computer system 14 and inserts the compound image 66 within the insert window 56.

The customer at the customer computer system 14 can now use the controls 36 to create further customizations of the image represented by the compound image 66. Such customizations may for example be a modification of the default customizations 38 or may include further customizations. Every time that a customization is made, the controls 36, at 70, transmit the customizations to the customization computer system 16 and are received as customizations 72 by the customization computer system 16. At 74, the customizations 72 are provided to the compound image generator 42. The compound image generator 42 then creates a compound image that includes the image 40 and the customizations 72. At 64, the compound image generator 42 provides an output comprising a compound image 66. At 68, the compound image 66 is inserted into the insert window 56.

When the customer makes another customization using the controls 36, these further customizations are, at 70, transmitted to and received as further customizations 72. At 74, the further customizations are provided to the compound image generator 42. The compound image generator 42 then creates a further compound image 66 using the image 40. At 64, the compound image generator 42 provides an output comprising a further compound image 66. Such a further compound image 66 is, at 68, inserted into the insert window 56. This loop is continued until the customer has customized the image to their liking.

The insert window 56 further includes a quantity field, for the customer to enter or select a quantity 80, and a save selector 82. A script 84 is associated with the save selector 82. The script 84 may form part of the script 20 originally received from the retailer computer system 12 at 30 or may be inserted by the customization computer system 16 when inserting the insert window 56. The customer selects the quantity 80 and then selects the save selector 82. At 86, selection of the save selector 82 causes execution of the script 84. The script 84, at 88, transmits a save instruction that includes the quantity 80 to the customization computer system 16. The following is an example of the scripts 84:

```
// Called when Shopper clicks 'Add to Cart' in the Lightbox
    onSave: function (action, data) {
        console.log('Add this product to the Shopping Cart.
    SKU: ' + data.sku + ' RefNum: ' + data.refnum + ' quantity: '
    + data.quantity );
        console.log('If you want to save the image of the
    personalization, use this URL: ' + data.imageURL );
    }
    // Called when the user clicks 'Cancel' [Optional]
    onCancel: function ( action, data ) {
    console.log('User cancelled the personalization');
    }
```

The customization computer system 16 includes a transmission packet 90 that includes a unique reference number 92, the compound image 66 and the quantity 80. The customization computer system 16, at 94, transmits the transmission packet 90 to the retailer computer system 12.

The retailer computer system 12 has a data store 96. A storing unit on the retailer computer system 12 stores the reference number 92, the compound image 66 and the quantity 80 in the data store 96. The retailer computer system 12 then enters the quantity 80 and the compound image 66 within a shopping cart 98. The shopping cart 98 is identified with an identifier of the customer computer system 14 so that the browser 26 of the customer computer system 14 can access the shopping cart 98 belonging to the customer computer system 14.

Figure 2:
FIG. 2 is a screenshot of a product page that is displayed within a browser window.

FIG. 2 illustrates a product page such as the product page 18 within the browser window 28 in FIG. 1. The product page 18 includes the image 22 of a product. The "PERSONALIZE" button serves as a customization selector such as the customization selector 24 in FIG. 1. The product page 18 includes details of the product, in particular its SKU and price.

Figure 3:
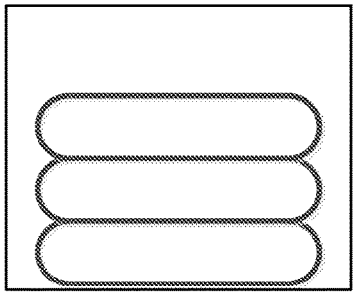
FIG. 3 is a view similar to FIG. 2 having an insert window overlaying the product page.

FIG. 3 illustrates the product page of FIG. 2 wherein an insert window such as the insert window 56 is positioned over the product page. The insert window 56 has an image such as the compound image 66 with default customizations in the form of the initials "DHA" on the image. The "ADD TO CART" button serves as a save selector such as the save selector 82 in FIG. 1. The "x" in the top right-hand corner serves as a close selector such as the close selector 58 in FIG. 1.

Figure 4:
FIG. 4 is a view similar to FIG. 3 of a shopping cart.

FIG. 4 illustrates a view of the shopping cart 98 when it is displayed within the browser window 28 in FIG. 1. The customer can select a product within the shopping cart 98 to further edit the customizations.

Figure 5:
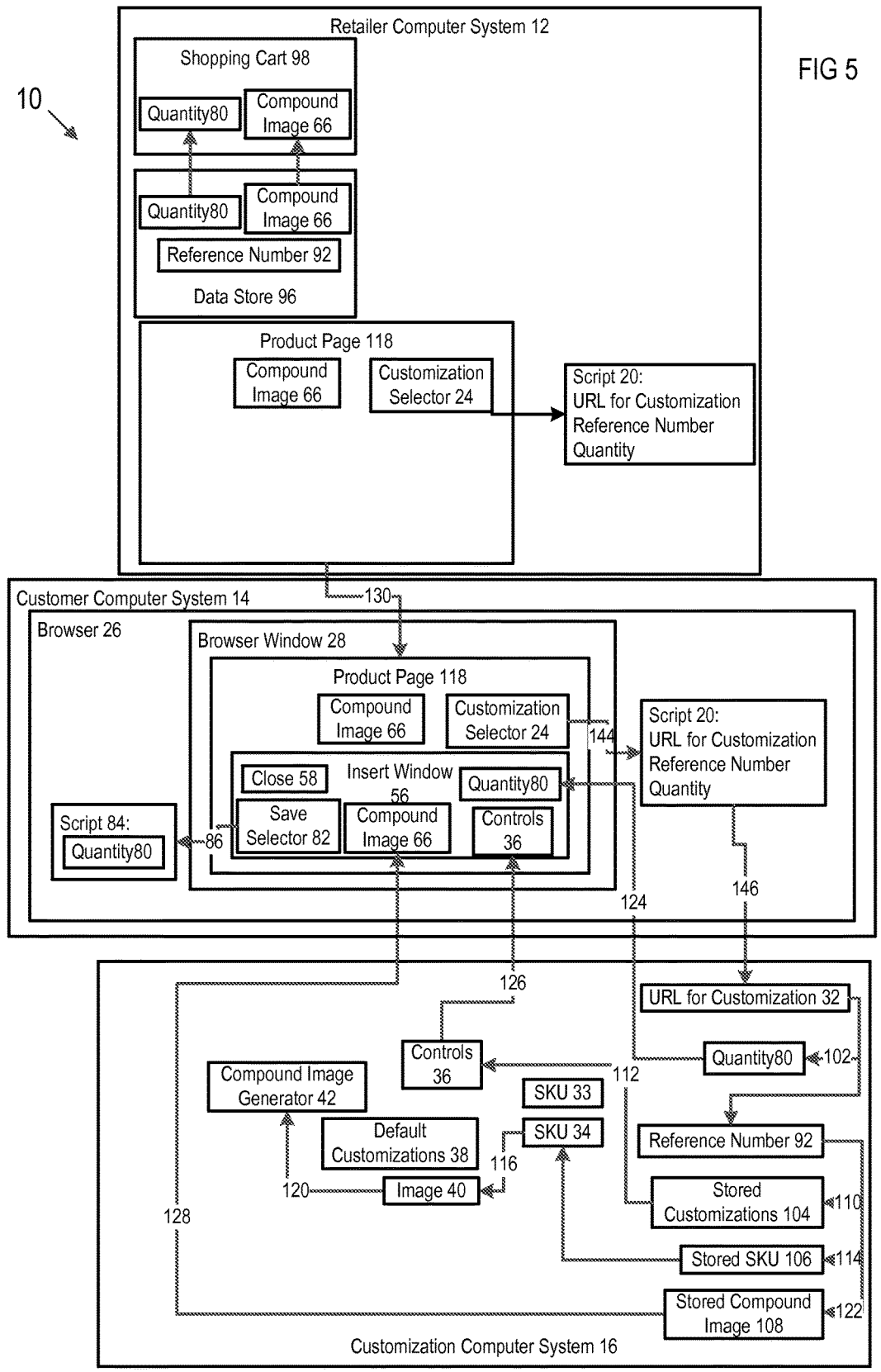
FIG. 5 is a view similar to FIG. 1 illustrating initiation of editing of an image.

FIG. 5 illustrates the initialization of editing of the image of the product. When the customer selects an item in their shopping cart 98, the retailer computer system 12 at 130 responds to the selection to transmit a product page 118 that is viewed within the browser window 28 of the browser 26 on the customer computer system 14. The product page 118 includes the compound image 66 from the data store 96 and the customization selector 24. At 130, the retailer computer system 12 also transmits the quantity 80 and the reference number 92 shown in the data store 96 to the customer computer system 14.

When the customer selects the customization selector 24, the script 20 is executed at 144. The script 20 includes the URL for customization corresponding to the URL for customization 32 of the customer computer system 14. The script 20 further includes the reference number 92 and the quantity 80. At 146, the script 20 transmits an edit request that includes the reference number 92 and the quantity 80, to the URL for customization 32 of the customization computer system 16. The customization computer system 16 receives the edit request transmitted at 146. The reference number 92 is all that is required by the customization computer system 16 in order to initiate editing or for later fulfillment of an order.

The customization computer system 16 then, at 102, stores the quantity 80 within its local data store. The customization computer system 16 then matches the reference number 92 received in the edit request 46 to one of a plurality of reference numbers, namely the reference number 92 in its local data store. The reference number 92 in the local data store of the customization computer system 16 has stored customizations 104, a stored SKU 106 and a stored compound image 108 associated with the reference number 92. The stored customizations 104 are the final customizations 72 made by the customer as discussed with reference to FIG. 1. The stored SKU 106 is the SKU 34 within FIG. 1. The stored compound image 108 is the final compound image 66 that is generated by the compound image generator 42 in FIG. 1. At 110, the customization computer system 16 accesses the stored customizations 104 associated with the reference number 92 and at 112, provides the customizations to the controls 36. The controls 36 use the stored customizations 104 for the initial settings of the controls 36. At 114, the customization computer system 16 accesses the stored SKU 106 and matches it to the selected SKU 34 among the SKU's 33 and 34. At 116, the customization computer system 16 accesses the image 40 associated with the selected SKU 34 and at 120, provides the image 40 to the compound image generator 42. At 122, the customization computer system 16 determines the stored compound image 108 associated with the reference number 92.

The customizations computer system 16 then generates an insert window 56 overlaying the product page 118. At 124, the customization computer system 16 inserts the quantity 80 into the insert window 56 for further selection or modification by the customer. At 126, the customization computer system 16 inserts the controls 36 with their initial settings as set by the stored customizations 104 into the insert window 56. At 128, the customization computer system 16 inserts the stored compound image 108 into the insert window 56. This completes initiation of the editing, with the customer being able to view the compound image 66 and the quantity 80 and having access to the controls 36.

Figure 6:
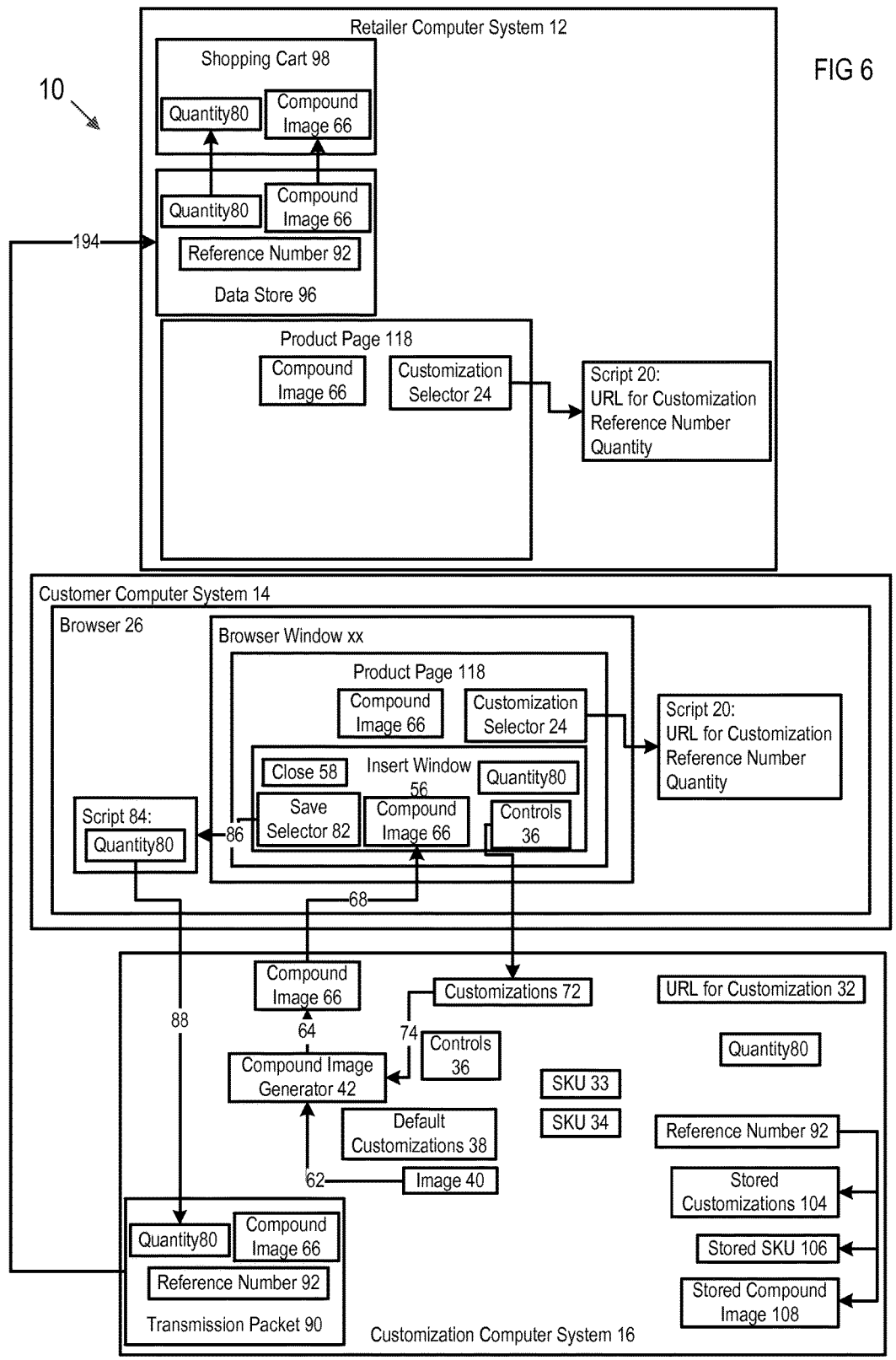
FIG. 6 is a view similar to FIG. 5 illustrating editing of the image.

FIG. 6 illustrates further editing of the compound image 66. Editing continues as described with reference to FIG. 1 and like reference numerals indicate like or similar steps or components. The customization computer system 16, at 194, transmits a transmission packet 90 to the retailer computer system 12. The retailer computer system 12 stores the reference number 92, a new compound image 66 and potentially a new quantity 80 within the data store 96. The new quantity 80 and new compound image 66 are then inserted into the shopping cart 98 of the customer computer system 14.

Figure 7:
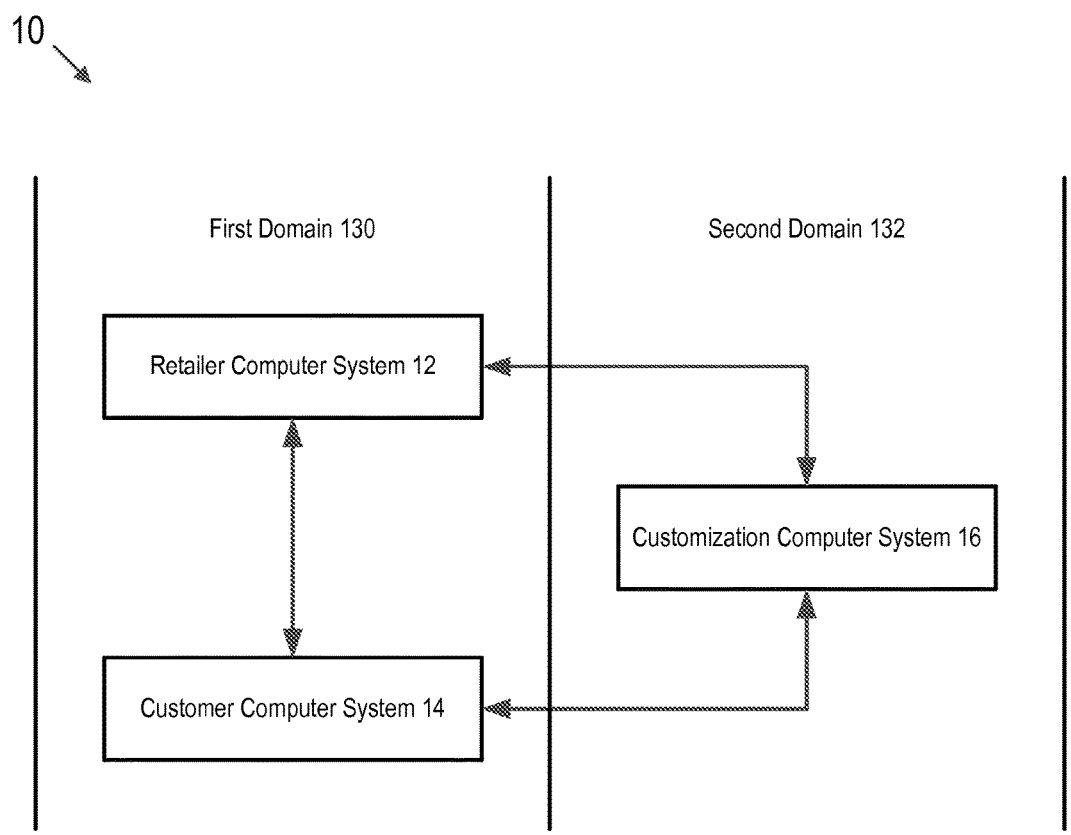
FIG. 7 is a view that illustrates the location and functioning of a customization computer system outside a domain that is shared by a retailer computer system and a customer computer system.

FIG. 7 shows the location and functioning of the systems 12, 14 and 16 with respect to first and second domains 130 and 132. The retailer computer system 12 and the customer computer system 14 are located in the first domain 130. The customization computer system 16 is located in the second domain 132. Although located in the second domain 132, the customization computer system 16 becomes part of the transaction between the retailer computer system 12 and the customer computer system 14. As hereinbefore described, some data is communicated between the retailer computer system 12 and the customer computer system 14 via the customization computer system 16 without direct communication between the retailer computer system 12 and the customer computer system 14.

Figure 8:
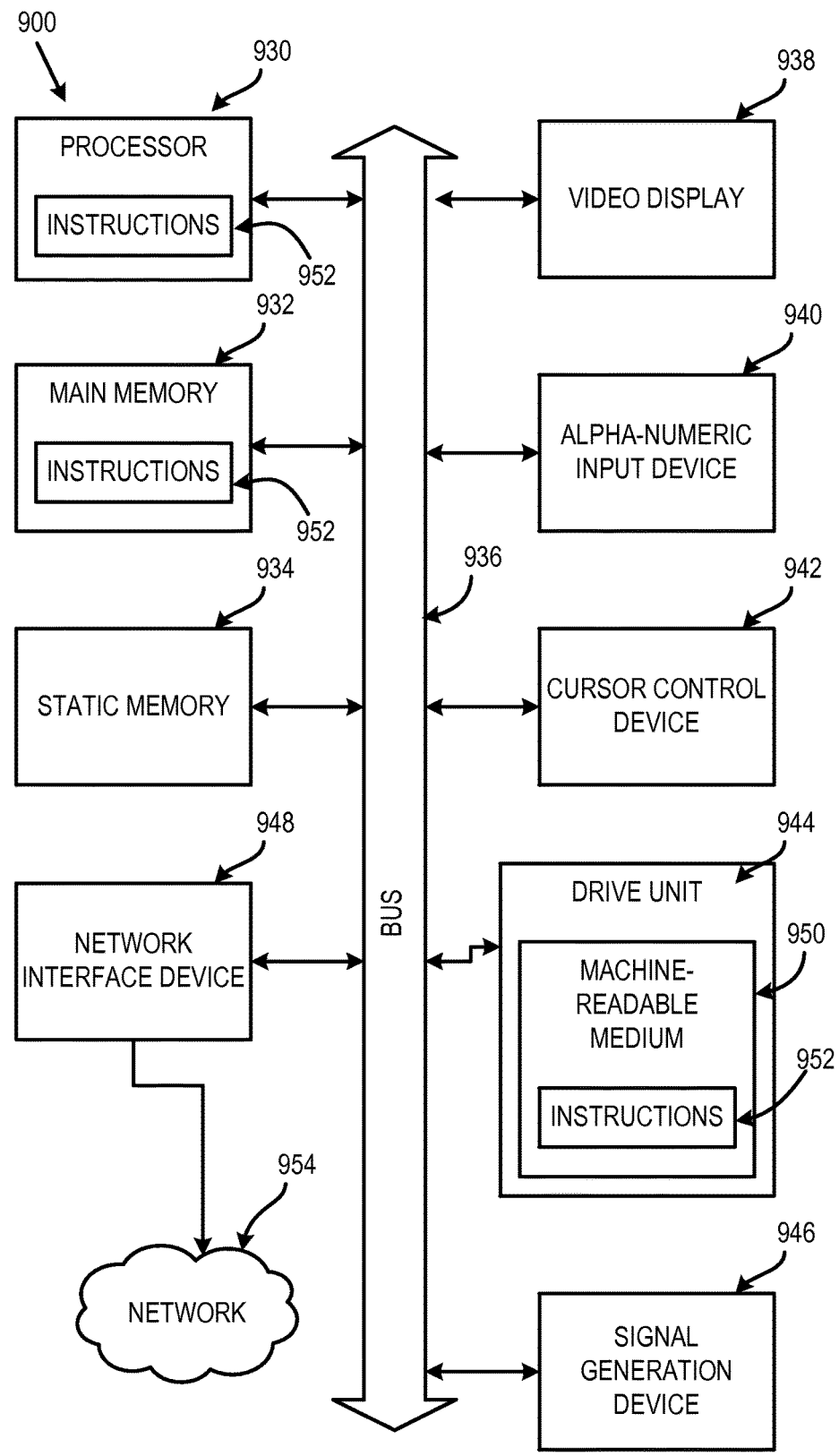
FIG. 8 is a block diagram of a machine in the form of a computer system forming part of the retail system.

FIG. 8 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a wearable, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer-implemented method of designing a customization of a product, comprising:
   receiving, by a customization computer system, a customization request from a customer computer system at the customization computer system, wherein the customization request is received due to a retailer computer system at a first domain that receives a page request from the customer computer system at the retailer computer system, and the retailer computer system, in response to receiving the page request from the customer computer system at the retailer computer system, transmitting a product page and a script from the retailer computer system to the customer computer system, wherein the script includes a uniform resource locator (URL) of the customization computer system at a second domain and is executable by the customer computer system to transmit the customization request from the customer computer system to the URL of the customization computer system;
   in response to receiving the customization request from the customer computer system at the customization computer system inserting, by the customization computer system, controls and a save selector onto the customer computer system, use of the controls at the customer computer system allowing for customization of an image of the product viewed on a display of the customer computer system to render a compound image including the image and at least one customization, selection of the save selector at the customer computer system causing transmission of a transmission packet to the retailer computer system, and reception of the transmission packet at the retailer computer system, the retailer computer system, in response to receiving the transmission packet, storing the compound image in a shopping cart associated with the customer computer system.

2. The method of claim 1, wherein the customization request includes a unique stock keeping unit (SKU), further comprising:
   matching, by the customization computer system, the SKU received in the customization request to one of a plurality of SKU's to identify a selected SKU;
   determining, by the customization computer system, controls associated with the selected SKU, the controls that are determined being the controls that are inserted by the customization computer system on to the customer computer system.

3. The method of claim 2, further comprising:
   determining, by the customization computer system, default customizations associated with the selected SKU, the default customizations being used by the selected controls to customize the image.

4. The method of claim 2, further comprising:
   determining, by the customization computer system, an image associated with the selected SKU;
   receiving, by the customization computer system, at least one customization from the customer computer system;
   generating, by the customization computer system, a compound image by adding the at least one customization received from the customer computer system to the image associated with the selected SKU to generate a compound image; and
   transmitting, by the customization computer system, the compound image generated by the customization computer system to the customer computer system for viewing on the display of the customer computer system.

5. The method of claim 4, wherein the controls are usable on the customer computer system while viewing the compound image on the customer computer system to generate at least one further customization, further comprising:
   receiving, by the customization computer system, the at least one further customization from the customer computer system;
   generating, by the customization computer system, a further compound image by adding the at least one further customization received from the customer computer system to the image associated with the selected SKU to generate a further compound image; and
   transmitting, by the customization computer system, the further compound image generated by the customization computer system to the customer computer system for viewing on the display of the customer computer system.

6. The method of claim 1, further comprising:
   receiving, by the customization computer system, a save instruction from the customer computer system in response to selection of the save selector at the customer computer system; and
   in response to receiving the save instruction from the customer computer system at the customization computer system, transmitting, by the customization computer system, the transmission packet from the customization computer system to the retailer computer system.

7. The method of claim 6, further comprising:
   inserting, by the customization computer system, a quantity selector onto the customer computer system for selection of a quantity on the customer computer system, wherein the save instruction includes the quantity and the customization computer system inserts the quantity into the transmission packet before transmission at the retailer computer system.

8. The method of claim 6, further comprising:
   inserting, by the customization computer system, a script onto the customer computer system, the script causing transmission of the save instruction in response to selection of the save selector.

9. The method of claim 1, further comprising:
   storing, by the customization computer system, a reference number;
   storing, by the customization computer system, stored customizations in association with the reference number, the stored customizations including the at least one customization;
   receiving, by the customization computer system, an edit request including a reference number from the customer computer system at the customization computer system;

matching, by the customization computer system, the reference number in the edit request with the reference number having the stored customizations associated therewith;

following the matching, transmitting, by the customization computer system, controls and a save selector from the customization computer system to the customer computer system, the controls being based on the stored customizations, use of the controls at the customer computer system allowing for customization of an image of the product viewed on a display of the customer computer system to render a compound image including the image and at least one customization, selection of the save selector at the customer computer system causing transmission of a transmission packet to a retailer computer system, and reception of the packet at the retailer computer system, the retailer computer system, in response to receiving the transmission packet, storing the compound image in a shopping cart associated with the customer computer system.

10. The method of claim 9, wherein the edit request includes a quantity, further comprising:

inserting, by the customization computer system, the quantity onto the customer computer system.

11. The method of claim 9, further comprising:

storing, by the customization computer system, the compound image in association with the reference number; and transmitting, by the customization computer system, the compound image from the customization computer system to the customer computer system in response to receiving the edit request.

12. The method of claim 9, further comprising:

storing, by the customization computer system, a unique stock keeping unit (SKU) in association with the reference number;

matching, by the customization computer system, the SKU associated with the reference number to one of a plurality of SKU's to identify a selected SKU;

determining, by the customization computer system, an image associated with the selected SKU;

transmitting, by the customization computer system, the image associated with the SKU from the customization computer system, to the customer computer system;

receiving, by the customization computer system, at least one customization from the customer computer system;

generating, by the customization computer system, a compound image by adding the at least one customization received from the customer computer system to the image associated with the selected SKU to generate a compound image; and transmitting, by the customization computer system, the compound image generated by the customization computer system to the customer computer system for viewing on the display of the customer computer system.

13. A customization computer system, comprising:

a processor;

a computer-readable medium connected to the processor; and a set of instructions on the computer-readable medium, the set of instructions including:

a reception unit receiving a customization request from a customer computer system, wherein the customization request is received due to a retailer computer system at a first domain that receives a page request from the customer computer system at the retailer computer system, and the retailer computer system, in response to receiving the page request from the customer computer system at the retailer computer system, transmitting a product page and a script from the retailer computer system to the customer computer system, wherein the script includes a uniform resource locator (URL) of the customization computer system at a second domain and is executable by the customer computer system to transmit the customization request from the customer computer system to the URL of the customization computer system;

controls;

a save selector; and insertion code that, in response to receiving the customization request from the customer computer system, inserts the controls and the save selector onto the customer computer system, use of the controls at the customer computer system allowing for customization of an image of the product viewed on a display of the customer computer system to render a compound image including the image and at least one customization, selection of the save selector at the customer computer system causing transmission of a transmission packet to the retailer computer system, and reception of the packet at the retailer computer system, the retailer computer system, in response to receiving the transmission packet, storing the compound image in a shopping cart associated with the customer computer system.

14. A computer-implemented method of designing a customization of a product, comprising:

receiving, by a retailer computer system at a first domain, a page request from a customer computer system at the retailer computer system;

in response to receiving the page request from a customer computer system at the retailer computer system, transmitting a product page and a script from the retailer computer system to the customer computer system, wherein the script includes a uniform resource locator (URL) of the customization computer system at a second domain and is executable by the customer computer system to transmit a customization request from the customer computer system to the URL of the customization computer system, the customization computer system responding to the customization request to insert controls onto the customer computer system for creating at least one customization of an image of the product, and a save selector that causes transmission of a transmission packet to the retailer computer system, the transmission packet including a compound image generated from the image and the at least one customization;

receiving, by the retailer computer system, the transmission packet; and in response to receiving the transmission packet by the retailer computer system, storing, by the retailer computer system, the compound image in a shopping cart associated with the customer computer system.

15. The method of claim 14, wherein the product includes a customization selector that, when selected at the customer computer system, causes execution of the script.

16. The method of claim 15, wherein the transmission packet is received from the customization computer system at the retailer computer system, wherein the transmission packet includes a reference number, further comprising:

transmitting, by the retailer computer system, the compound image from the retailer computer system to the customer computer system.

17. The method of claim 16, further comprising:

transmitting, by the retailer computer system, the reference number together with the compound image from the retailer computer system to the customer computer system, selection of the customization selector causing transmission of the reference number from the customer computer system to the customization computer.

18. A retailer computer system comprising:

a processor;

a computer-readable medium connected to the processor; and a set of instructions on the computer-readable medium, the set of instructions including:

a reception unit receiving a page request from a customer computer system;

a product page;

a script;

a transmission unit transmitting the product page and the script from the retailer computer system to the customer computer system, wherein the script includes a uniform resource locator (URL) of a customization computer system at a second domain and is executable by the customer computer system to transmit a customization request from the customer computer system to the URL of the customization computer system, the customization computer system responding to the customization request to insert controls onto the customer computer system for creating at least one customization of an image of the product and a save selector that causes transmission of a transmission packet to the retailer computer system, the transmission packet including a compound image generated from the image and the at least one customization, the reception unit receiving the transmission packet;

a shopping cart; and a storing unit that in response to receiving the transmission packet by the retailer computer system, storing, by the retailer computer system, the compound image in a shopping cart associated with the customer computer system.

* * * * *